United States Patent [19]

Wolf

[11] 4,133,433

[45] Jan. 9, 1979

[54] MERCHANDISING DISPLAY SYSTEM

[76] Inventor: Morris A. Wolf, 7048 Macapo Dr., Los Angeles, Calif. 90068

[21] Appl. No.: 781,555

[22] Filed: Mar. 28, 1977

[51] Int. Cl.² .......................................... A47B 57/16
[52] U.S. Cl. .................................. 211/192; 248/243; 403/255
[58] Field of Search ............... 211/182, 183, 186, 187, 211/189, 190, 191, 192, 193, 208; 248/222.1, 243; 403/252, 254, 255, 316, 317, 319

[56] References Cited

U.S. PATENT DOCUMENTS

| 1,760,503 | 5/1930 | Knape | 248/243 |
|---|---|---|---|
| 1,974,050 | 9/1934 | Keil | 248/243 |
| 2,031,718 | 2/1936 | Kress | 211/182 X |
| 3,269,077 | 8/1966 | Janus | 248/243 X |
| 3,458,052 | 7/1969 | Kann | 403/255 X |
| 3,513,606 | 5/1970 | Jones | 211/182 X |
| 3,613,900 | 10/1971 | Chiu | 211/186 X |
| 3,672,710 | 6/1972 | Kroopp | 403/255 X |
| 3,714,748 | 2/1973 | Costruba | 248/243 X |
| 3,730,108 | 5/1973 | Stroh | 211/192 X |

FOREIGN PATENT DOCUMENTS

| 1220981 | 6/1966 | Fed. Rep. of Germany | 211/87 |
|---|---|---|---|
| 1380062 | 10/1964 | France | 248/243 |
| 1445606 | 6/1966 | France | 211/87 |
| 570667 | 11/1956 | Italy | 248/243 |
| 358563 | 1/1962 | Switzerland | 211/187 |

*Primary Examiner*—Thomas J. Holko
*Attorney, Agent, or Firm*—Fulwider, Patton, Rieber, Lee & Utecht

[57] ABSTRACT

A system of posts and struts with which a variety of different decorative and utilitarian merchandising display assemblies are made, and display accessories for the assemblies. The posts are hollow and have a plurality of angularly spaced longitudinal grooves with slotted bottom walls, and the struts have mounting brackets adjacent their ends for engagement with the slotted bottom walls, and screw mechanisms for tightening and locking the brackets. The grooves are bounded by longitudinal ribs against which the struts abut, and similar grooves and ribs are provided on the struts to receive panels, both the struts and the posts being covered, between the ribbed grooves, with decorative sheet material. Accessories such as hangers and shelves are mounted on the posts with brackets insertible in the slotted grooves and extending out for supporting engagement with the accessories. Representatives display assemblies made with these basic components are a housewares display and a combined fitting room and manikin stand with hanging racks for clothing.

12 Claims, 15 Drawing Figures

MERCHANDISING DISPLAY SYSTEM

BACKGROUND OF THE INVENTION

This invention relates to structures and frameworks, and has particular reference to the construction of display systems for use in the merchandising field, that is, structures and frameworks that serve as artistic and decorative supports and backgrounds for merchandise that is on sale in establishments of various kinds, for example, department stores and the like.

In the past, systems of a number of kinds have been available to the merchandiser, to provide shelves, racks, hangers, brackets, hangrails and other facilities upon which merchandise can be displayed. While permanent installations have been used for these purposes, the changing needs of merchandisers have made it desirable to be able to change and rearrange displays with relative ease and economy.

This need for flexibility and versatility has been satisfied to some extent by display systems using wall strips or frames that have rows of slots for receiving mounting brackets formed with one or more, usually two, hook-like tabs. Such tabs interfit with, and lock into, the slots, and are readily movable from one location along a strip or frame to another when a change in position is desired. Thus, a shelf, for example, can be raised or lowered, or a shelf of a different size can be substituted, or any number of different display accessories, provided with mounting brackets, can be installed.

The principal disadvantage of such systems has been their generally unattractive (even unsightly) appearance, which has made them unacceptable to establishements in which attractiveness of design and decor is important. One partial solution of this aspect of the problem has been the use of special slotted strips recessed into panel walls, in the joints between adjacent panels, to provide inconspicuous grooves in the joints for receiving mounting brackets. Such joints fall for short, however, of providing for all of the display needs that can arise.

SUMMARY OF THE INVENTION

The present invention contemplates a unique system of display structures and frameworks with which a virtually endless variety of displays can be created and assembled, without the limitations of conventional systems, and most importantly, in a highly decorative fashion. Moreover, the invention makes it practical to mass-produce the basic components of the system with the cost advantages derived from such mass-production, and at the same time to tailor the ornamentation of the components to the desires of an individual merchandiser, to create distinctive structural arrangements with such components to suit the needs and taste of the individual merchandiser, and to change such ornamentation with a minimum of difficulty when a later change in decor is desired.

To these ends, the invention utilizes as its basic component an elongated post that has a plurality of longitudinal grooves in its sides, with slotted bottom walls for receiving the tabs of mounting brackets, the grooves being angularly spaced around the post and unconspicuously incorporated therein in a manner that does not detract from the attractive appearance of the post. The second basic component is a crosspiece or strut having a special mounting bracket in each end for secure and rapid locking engagement with the slotted bottom walls of the grooves in posts. Both the posts and the struts may be mass-produced as elongated hollow elements in one or more standard lengths, for example, as metal or plastic extrusions, and cut to size if a non-standard length is needed, and can be covered with conventional sheet materials, such as wood veneer fabric, or other wall coverings, for a highly decorative appearance.

Using these two basic components, and variations thereof, a framework is constructed to receive shelves, hangers, paneling and other accessories which cooperate to produce an attractive and ultilitarian display. Moreover, parts for a number of structurally identical displays can be prepared in the factory and assembled quickly and easily on different sites, with either identical or differing decoration.

More specifically, the preferred post of the invention has four grooves that are spaced ninety degrees apart around the post, and is substantially square in cross-section, with four flat sides and four rounded corners, but other shapes also may be used. For alignment purposes, the grooves preferably are centered on the sides of the post, and to provide firm bearing surfaces and protect decorative coverings for the post, each groove is bounded on the outside by two longitudinal ribs that project outwardly from the post at least as far as the thickness of the decorative covering to be used. The inner portion of the groove is defined by a channel having a slotted bottom wall.

Although other shapes may be used, the preferred struts are of hollow, generally rectangular cross-section, with two relatively broad sides and two relatively narrow sides. The mounting brackets are positioned near the ends, with notched, hooklike tabs that project out of the ends in the central plane of the strut for engagement with the slotted bottom walls in the post grooves, and with screw mechanisms for tightening the taps against the bottom wall and also for inserting a locking plunger into one of the slots to hold the posts securely together, automatically as an incident to the tightening operation. Each screw mechanism is operated by an inconspicuous and easily operable nut accessible from outside the strut, and the narrower sides of the struts preferably have grooves similar to the grooves in the posts, for holding panles and the like in the framework. These grooves also are bounded by ribs, similar to the ribs on the post.

Accessories for use with the basic components can be made in a wide variety of configuration, including hangers, stands, sign brackets, hooks and rails, either with attached mounting brackets or to receive individually formed, separate brackets. The preferred bracket configuration has a shaped tab for fitting into one of the slots, a foot for abutting against the bottom wall of the slotted groove, and a body adapted to support an accessory, which may simply rest on the bracket body, may be attached with fasteners such as screws, or may have a pin engageable in a notch in the bracket. One or more brackets will be provided for an accessory, depending upon the nature of the accessory.

Two exemplary displays are shown herein to illustrate the principles and versatility of the invention. Innumerable other displays can be created to suit the needs of a particular situation, whether as free-standing independent displays or in combination with other permanent fixtures.

Other aspects and advantages of the invention will become apparent from the following detailed description, taken in conjunction with the accompanying drawings.

DETAILED DESCRIPTION

Figure 1:
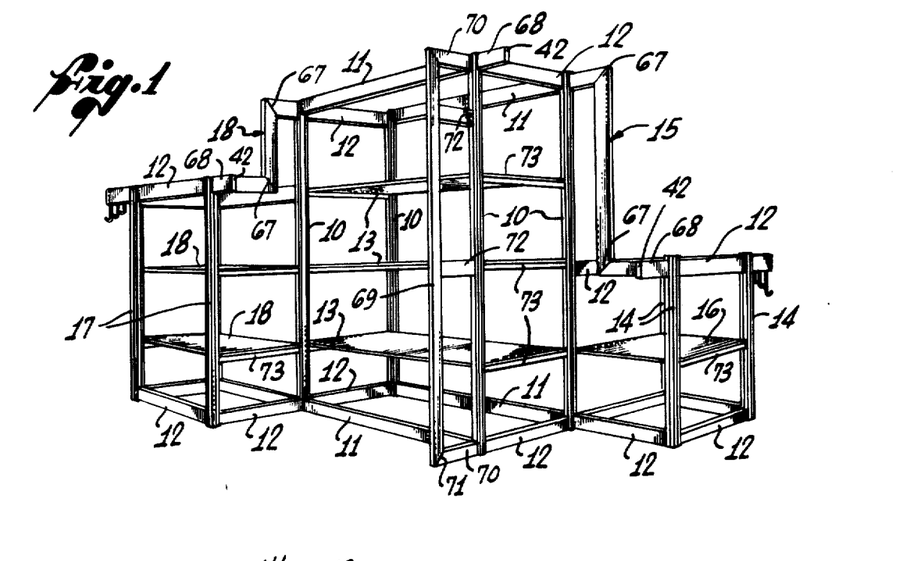
FIG. 1 is a perspective view of a representative merchandising display in accordance with the present invention, the display being of the type principally providing shelves for merchandise.
Figure 2:
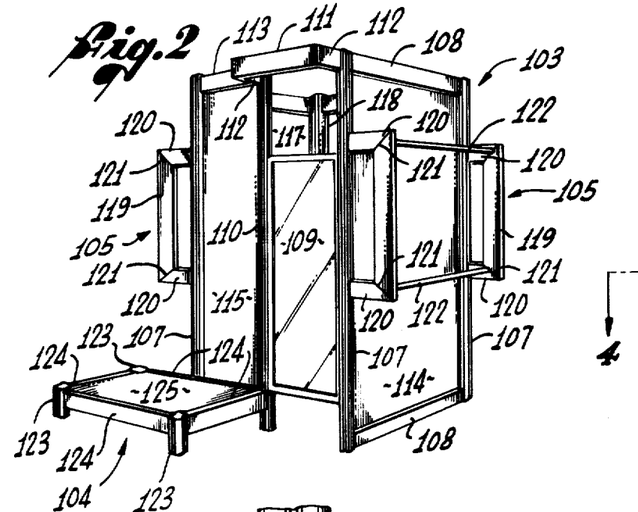
FIG. 2 is a perspective view of another representative merchandising display in accordance with the invention, this display being a combined fitting room, manikin stand and clothing rack.

As shown in FIGS. 1 and 2 for purposes of illustration, the invention is embodied in two representative merchandising displays of types that can be produced with the basic components and concept of the present invention. These displays are intended for use in retail stores and other establishments to support merchandise that is for sale, and also to contribute to the overall decor of the store, as an attractive and functional part of that decor.

Shown in FIG. 1 is a merchandising display that provides a relatively large amount of shelf area, such as might be used to display cookware, dishes and miscellaneous items generally referred to as housewares. This display comprises: (1) a high central display section formed by four upright posts 10 that constitute the four corners of the section, upper and lower end structures each formed by two side beams or struts 11 and two shorter end beams or struts 12, and three rectangular shelves 13, that are supported between the four posts; (2) a low right end display section formed by three shorter upright posts 14 and the lower portion of one post 10, a lower end structure formed by four of the shorter struts 12, an upper end structure formed by three of the shorter struts 12 and a generally Z-shaped tie strut 15, and a central rectangular shelf 16; and (3) a left end display section formed by three posts 17 of intermediate length and the lower portion of one post 10, two rectangular shelves 18, a lower end structure formed by four of the shorter struts 12, and an upper end structure formed by three of the shorter struts 12 and a generally Z-shaped tie strut 18.

Except for the shelves and the Z-shaped tie struts, the foregoing elements are merely different lengths of two basic components of the invention, namely, elongated posts and elongated beams or struts, both of which may be mass-produced in a factory operation with the fabricating economies achieved with such production. The struts are provided with mounting brackets 19 and tightening mechanisms 20 in accordance with the invention, for coupling them to the posts, and with any special accessories that are desired for a particular installation. The components can be decorated on a custom basis and then shipped in knocked-down condition for assembly on the site.

Figure 3:
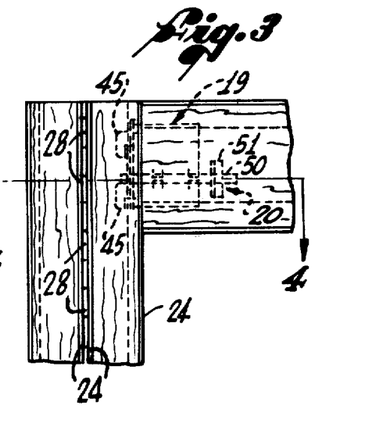
FIG. 3 is an enlarged fragmentary side elevational view of a corner joint between a post and a strut.
Figure 4:
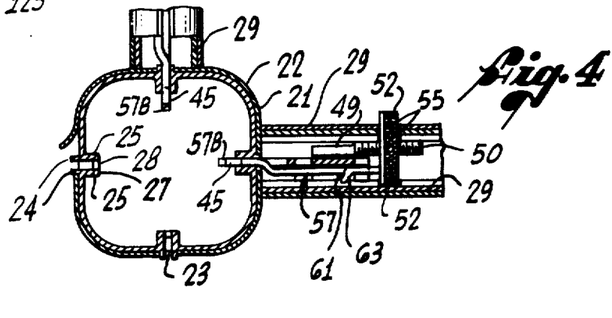
FIG. 4 is a fragmentary cross-sectional view taken substantially along line 4—4 of FIG. 3, with a second strut partially illustrated at a right angle to the first strut, and with a decorative sheet separated in one area from the post.
Figures 5, 6, 7, 8, 9, 10:
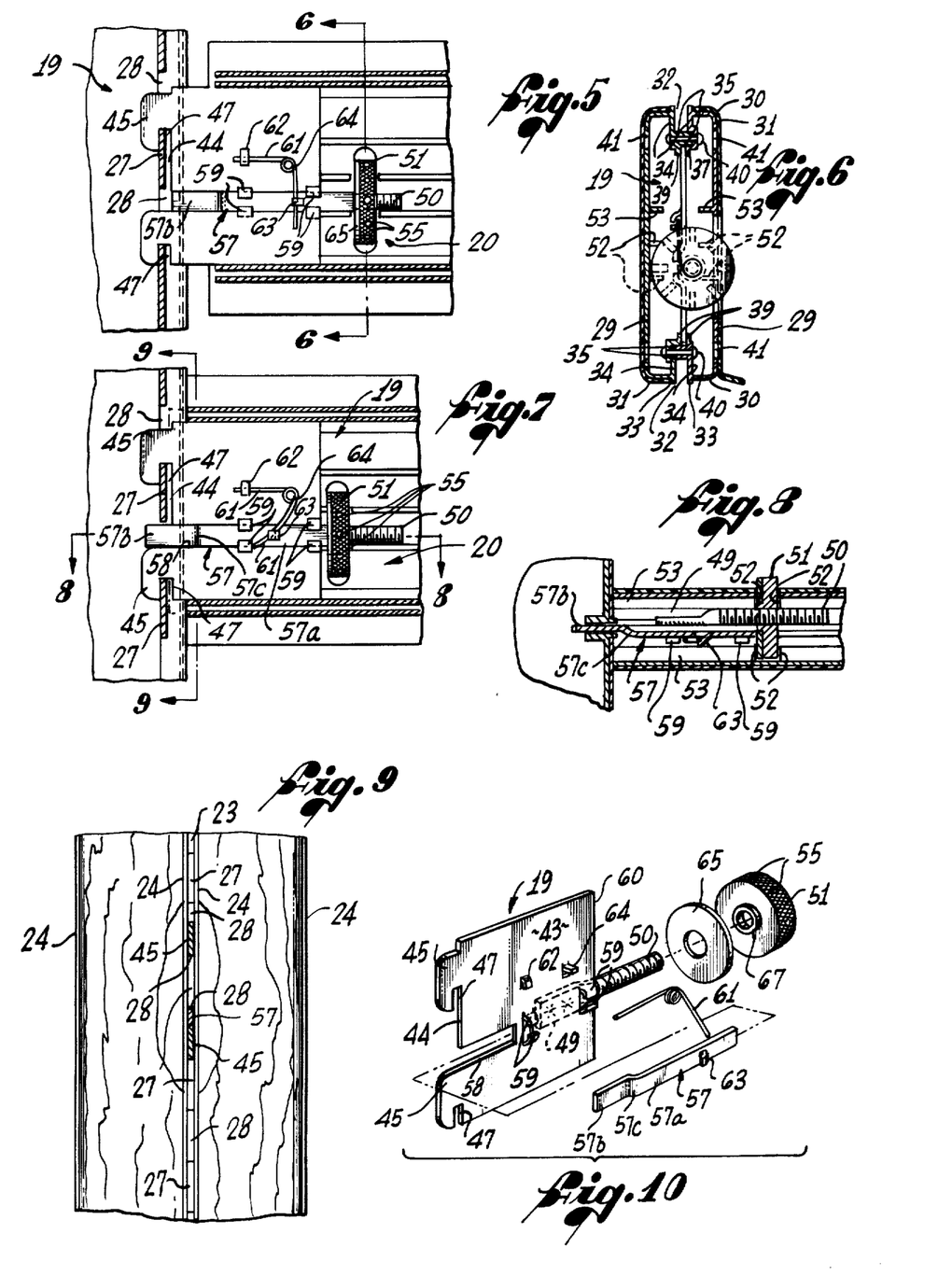
FIG. 5 is a fragmentary cross-section taken substantially along line 5—5 of FIG. 4, but showing the engaged condition of the parts before tightening.
FIG. 6 is a cross-section taken along line 6—6 of FIG. 5, also with a portion of a decorative sheet separated in one area from the strut.
FIG. 7 is a view similar to FIG. 5 with the parts in tightened condition.
FIG. 8 is a fragmentary cross-section taken along line 8—8 of FIG. 7.
FIG. 9 is an enlarged fragmentary side elevation of a portion of a post, with parts of a decorative sheet broken away.
FIG. 10 is an exploded perspective view of a mounting bracket and its tightening mechanism.

Because one standardized post configuration may be used, with one standardized strut configuration and one standardized joint connecting the struts to the posts, the illustrations shown in FIGS. 3 through 10 are representative of all of the standard components of the display shown in FIG. 1. Specifically, as shown in FIGS. 3, 4, and 9, the upright posts have elongated hollow bodies, and preferably are of generally rectangular (square) cross-section with four flat sides 21 and four rounded corners 22, which contribute a more natural and decorative appearance to the finished product. These posts could be composed, for example, of molded or extruded plastic, but the preferred composition is extruded aluminum.

In the central portion of each flat side 21 of the post is a narrow longitudinal groove 23 which extends the full length of the post and is bounded along its outer side by two narrow ribs 24 that project outwardly from the outside surface of the post a selected distance, at least as great as the thickness of decorative coverings to be used, and preferably slightly greater, the outer surfaces of the two ribs being coplaner. These ribs are outward, substantially coplanar extensions of two sidewalls 25 of a U-shaped channel inside the post, the channel having a bottom wall 27 that is formed with latching recesses in the form of a row of longitudinally spaced slots 28.

Such posts can be extruded in one piece with the channels 25, 27 integrally joining the intervening sections of the post wall, and cut to desired lengths, the only additional operation needed being the punching of the slots 28 in the wall 27. One suitable post is approximately four inches on each side, with grooves on the order of five-sixteenths of an inch wide and a slot length on the order of one inch long, the "rise" of the ribs outside the post being approximately three-sixteenths of an inch. A suitable wall thickness for aluminum is approximately one-eighth of an inch. It should be noted, however, that these dimensions are merely representative, and are not to be taken as limiting in any way.

The details of the presently preferred configuration of the strut are shown most clearly in FIGS. 4, 5, and 6, wherein it will be seen that the strut is of hollow, generally rectangular cross-sectional shape, having two relatively broad sides 29 and two relatively narrow sides 30, and four corners 31 that are rounded on a relatively short radius. Centrally located in each of the narrow sides 30 is a longitudinal groove 32 (see FIG. 6) that is bounded by two ribs 33 projecting outwardly from the strut and similar to the ribs 24 of the posts. The inner portions of these grooves also are defined by channels, having sidewalls 34 and bottom walls 35, but slots typically are not provided in the bottom walls of the struts.

While the struts could be made as one-piece extrusions, the illustrative configuration is made in two elongated pieces that are fitted and secured together in side-by-side relation, the parting line being a plane through the grooves 32. As shown in FIG. 6, each half strut has a full side 29 and two halves of the narrow sides 30, and an in-turned flange extends along each side and constitutes one sidewall 34 of a channel. One such flange on each half strut is shaped to provide a laterally opening longitudinal seat 37, and the other flange has two generally parallel webs 35 for extending across the inner side of the groove and into the seat of the opposed flange, the outer one of these webs forming the bottom wall of the groove. Each flange has an inwardly projecting rib 39 that is spaced from the other rib to define an internal longitudinal groove when the strut halves are assembled.

To hold the halves together, suitable fasteners, such as rivets 40 extend through the inner portions of the flanges, inwardly beyond the bottoms of the grooves. For access, holes 41 are drilled through one of the sidewalls, in alignment with rivet holes in the flanges, later to be covered with decorative sheet material.

The opposite ends of the struts can be left open, because these almost always abut against a post in a finished assembly. An end cap (not shown) can be provided for a situation in which an end is to be exposed, or a filler such as fiberglass can be applied to the open end, as indicated at 42 in FIG. 1.

As shown in FIGS. 5, 6 and 7, the internal structure of the struts provides support for the mounting brackets 19 and the tightening mechanisms 20 to be housed therein, the basic element of the preferred mounting bracket being a flat, generally rectangular base plate 43 that is sized to fit into the two internal grooves defined between the two sets of internal ribs 39. These grooves support the base plate in the central plane of the strut, midway between the broader sides 29, and permit the base plate to slide relatively freely back and forth, toward and away from the adjacent open end of the strut.

Formed on the one edge 44 of the base plate, the edge closest to the open end of the strut, are two latching elements in the form of tabs 45 which extend outwardly for insertion in one of the grooves 23 of a post. These tabs are slightly narrower than the length of a slot 28, and are spaced apart on the base plate to coincide with the spacing of the slots in the bottom wall 27. The thickness of the base plate and the tabs is less than the width of the grooves 23, so that the tabs will fit freely into the groove and the slots, as shown in FIG. 5.

Two notches 47, substantially wider than the thickness of the bottom wall 27, are formed in corresponding sides of the two tabs, the undersides as viewed in FIGS. 5 and 6, so that the tabs form hook-like projections on the outer edge 44 of the base plate. These notches drop down over the bottom wall 27 after insertion of the tabs, and permit the tabs to move into loosely latched engagement with a post. The base plate and the tabs preferably are formed integrally as parts of a sheet metal stamping.

The tightening mechanisms 20 for the mounting brackets 19 are relatively simple screw mechanisms that are built into the struts to pull the brackets longitudinally of the struts from extended positions (see FIG. 5) to retracted positions (see FIG. 7), in one direction of operation of the screw mechanism, and to extend the brackets when the mechanisms are operated in the opposite direction. For these purposes, the screw mechanism comprises an elongated stud having a flattened end portion 49 that is disposed against one side of the base plate and secured thereto, for example, by welding, and a threaded free end portion 50 which extends inwardly from the base plate and through a cylindrical nut 51. The nut is rotatably supported in the strut, but is held against axial movement by opposed abutments 52 (FIGS. 6 and 8) in the strut, these abutments being surfaces of longitudinal strengthening webs 53 that are formed on the inner walls of the broad sides of the strut.

With this arrangement, rotation of the nut 51 shifts the threaded end 50 axially through the nut, longitudinally of the strut, to move the associated mounting bracket 19 in a selected direction. The nut is offset slightly from the center of the strut, and has a large enough radius to project into, and preferably through, a slot 54 in one side 29 of the strut, and the periphery of the nut is knurled to facilitate manual turning. In addition, radial bores 55 are provided in the nut to receive a tool (not shown) in the form of a nail or other simple rod, for final tightening, and eventual loosening, of the screw mechanism.

For positive locking of the struts on the posts, a special locking plunger 57 is incorporated in the screw mechanism to be inserted into one of the slots 28, alongside one of the tabs 45, as an incident to the tightening of the mounting bracket. The plunger is an elongated bar, preferably composed of material that is of the same thickness as the base plate, and has an inner end portion $57^a$ that is disposed alongside the base plate, and an outer end portion $57^b$ that is offset, at a bend $57^c$, into an elongated notch 58 in the outer portion of the base plate, opening out of the base plate in line with one side of one of the tabs 45, the side opposite the notch 47 in the tab.

Two pairs of fingers 59 are punched out of the inner portion of the base plate 43 and bent outwardly to form retainers for the plunger 57, in line with the notch 58, and the inner end portion of the plunger is slidably held between these fingers. The length of the plunger is approximately the same as the longitudinal distance from the inner edge 60 of the base plate to the outer ends of the tabs 45, and in the retracted position, the inner end portion $57^a$ projects inwardly well beyond the edge 60.

The plunger 57 is urged yieldably toward the retracted position by means of a spring 61 acting between an anchor 62 on the base plate and an anchor 63 on the plunger, the anchors herein being small tabs that are punched out of the two parts, and the spring being a length of spring wire having a central portion that is coiled around a stud 64 punched out on one side of the base plate. Opposite end portions of the spring are stressed and confined against the anchor tabs 62 and 63.

As shown in FIG. 5, the inner end of the plunger 57 is held by the spring 61 against a bearing washer 65 that is disposed against the outer side of the nut 51, around a cylindrical boss 67 (FIG. 10) on the nut. This effectively fixes the position of the plunger relative to the strut, while the plunger remains movable relative to the base plate, between the retracted and extended positions shown in FIGS. 5 and 7, respectively.

Thus, as the mounting bracket 19 is drawn into the strut, the plunger 57 is restrained by the nut 51 through the washer 65, against moving inwardly with the bracket. As the tabs 45 are drawn inwardly and the strut is pulled closer to the post, the plunger is extended relative to the tabs for insertion into the slot 28 in which the adjacent tab is engaged. When this tab is in the engaged position shown in FIGS. 5 and 7, the plunger enters the slot alongside the tab, and thereafter blocks movement of the tab longitudinally of the groove to any position in which the tab can be pulled out of the slot, even if the screw mechanism should become loosened to some extent. Of course, when the screw mechanism is turned reversely to the extent necessary to draw the plunger out of the slot, the tabs can be readily disengaged for separation of the strut from the post.

The Z-shaped tie bars 15 and 18 shown in FIG. 1 illustrate another capability of the basic components of the system, each tie bar being three sections of the basic strut shown in FIGS. 3 through 8 in miter joints 67 with ends that are suitably joined together, for example, by welding, into the Z-shaped configuration. Standard screw mechanisms 20 and mounting brackets 19 are provided in the ends of the tie bars, thus permitting these bars to be joined to the posts in the same manner as the straight struts.

Other special adaptations are represented by the three straight struts 68 with closed ends 42 that are shown in FIG. 1 at the upper ends of selected posts, one in each of the three display sections. These are principally decorative pieces, each having a mounting bracket and a screw mechanism for securing the strut to the post.

Another special adaptation is represented by an elongated, open-sided frame mounted on the front of one post 10 in FIG. 1, this frame comprising an upright strut 69 of virtually the same length as the posts 10, two horizontal struts 70 that are secured to the upper and lower ends of the upright strut 69 at miter joints 71, and two intermediate horizontal struts 72 each having one end that is secured to the upright strut, for example, by welding, and a free end that is aligned with the free ends of the upper and lower struts, to abut against the post 10. In the free end of each of the short struts 72 are a standard mounting bracket and a standard screw mechanism, with which the strut is coupled to the post.

Figure 14:
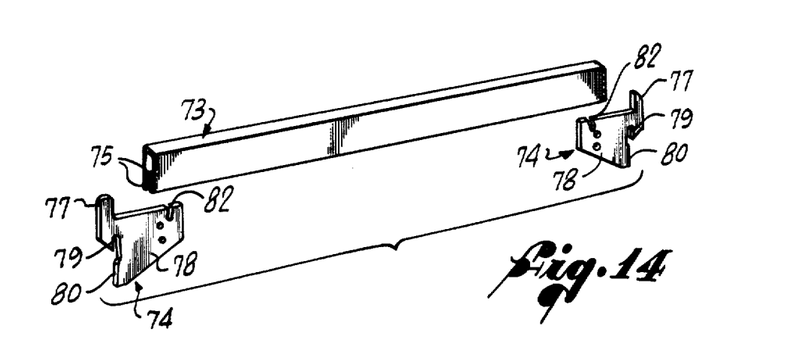
FIG. 14 is an enlarged exploded perspective view of a shelf rail with two mounting brackets, as used in the display of FIG. 1.

For display purposes, various types of article-holding accessories may be attached to the display, using the slotted grooves 23 in basically the same manner as the slotted strips or frames of conventional systems, to hold bracket-equipped accessories as needed for a particular installation. The shelves 13, 16 and 18, for example might be provided with attached mounting brackets, but the illustrative shelves are mounted on crossrails 73 (FIGS. 1 and 14) that are supported on special mounting brackets 74 for locking into the grooves in the posts. With this arrangement, shelves of any desired material, such as glass, can be supported on the cross-rails. As shown in FIG. 14, the cross-rails can be conventional sheet metal rails, either circular or rectangular in cross-section, with slotted undersides formed by bending the free edge portions 75 of the metal upwardly in spaced relation with each other.

The two accessory brackets 74, which are designed for what may be termed "universal" usage in the system of the invention, are metal plates comprising a tab 77 that is sized and shaped to fit into one of the slots 28, much in the same manner as the tabs 45 on the mounting brackets 19, and a body 78 for projecting out of the grooves 23 and engaging a part to be supported. A notch 79 similar to the notches 47 is formed in the underside of each tab 77, and the adjacent edge 80 of the body 78 is offset, below the tab, toward the plane of the adjacent edge of the tab to a spacing from this plane that is equal to the thickness of the bottom walls 27 of the grooves 23. Thus, each edge 80 forms a "foot" for the bracket 74 that engages the outer side of the bottom wall of the groove while the tab 77 is engagement with the opposite side of the wall, thereby providing a firm support for an accessory.

The upper edge 81 of the bracket 74 is perpendicular to the front edge of the tab, to engage and hold an accessory such as the rail 73, and an inclined notch 82 preferably is formed near the outer edge 83 of the bracket, to receive a crosspin (not shown) on an accessory, if positive engagement is desired. Two tapped holes 84 are provided in each bracket, for receiving screws for attaching the bracket to an accessory.

Figures 11, 12, 13:
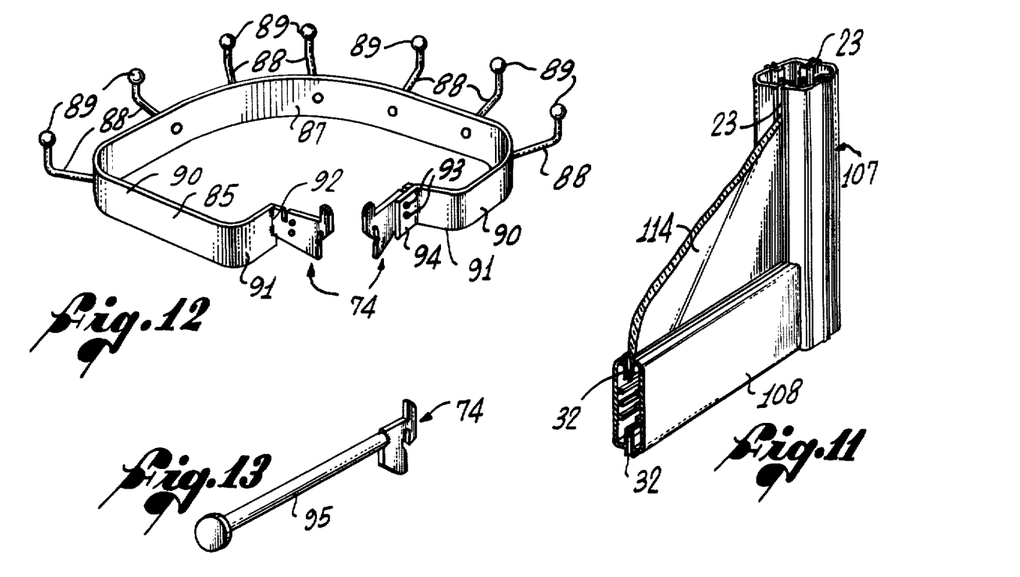
FIG. 11 is an enlarged fragmentary perspective view showing the lower right corner of the display of FIG. 2, partially in cross-section.
FIG. 12 is an enlarged perspective view of a multiple hanger accessory.
FIG. 13 is an enlarged perspective view of a single hanger accessory.

Shown in FIG. 12 is a multiple-hook accessory 85 in which the tapped holes 84 are used to mount a bracket 74 on the accessory. This unit comprises a strap 87 of relatively stiff sheet metal having a quarter-circular portion on which a plurality of L-shaped rods 88 are mounted, in radially projecting positions, with upturned free end portions capped by balls 89. From each end of the quarter circular portion, the strap has a leg 90 which extends radially inwardly, and an inturned inner end portion 91 at a 90-degree angle to the leg. Secured to the inner ends of these inturned portions are two of the brackets 74, oriented at ninety degrees to each other to fit into two adjacent grooves 23 of a post.

The bracket 74 on the left in FIG. 12 is welded to the strap 87, as indicated at 92, and the bracket 74 on the right is releasably attached, by two screws 93, to a plate 94 affixed to the strap. Use of the screws 93 permits the installation of this accessory on a post while one bracket is removed, and the insertion of the separated bracket into a groove 23 prior to attachment of the bracket to the plate 94. Without this releasable attachment, it would be difficult, if at all possible, to install such an accessory on a post.

Figure 15:
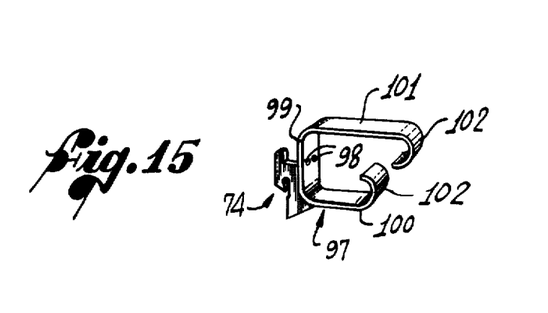
FIG. 15 is an enlarged perspective view of a hook/-hanger accessory.

A simple hanger rod 95 is shown in FIG. 13, with a single accessory bracket 74 welded to one end. A more stylized clothing hook 97 is shown in FIG. 15, also with a single bracket 74 permanently attached to its back side, this time with rivets, indicated at 98. This hook is a basically U-shaped metal strap having two generally parallel legs 100 and 101, with free end portions 102 that are bent toward each other in a curled fashion.

In all of these accessories, the brackets may be the same as the brackets used to support the shelf rail 73, as shown in FIG. 14. This can be considered a third basic component of the system, usable with a wide variety of accessories that can be installed on the posts of the invention.

It bears emphasis that the invention lends itself readily to decoration with sheet materials, and that the end products have a highly attractive appearance suited for quality establishments in which the effect upon decor is an important aspect of any display system. For example, when the posts and struts are covered with a thin wood veneer, of one of the types presently available in flexible sheets, the resulting display will appear to have been constructed of actual wood components, with all the richness and beauty of wood. Also, fabrics can be used to coordinate with fabrics in articles to be displayed, giving the merchandiser a special capability. Sheet vinyls and wall papers also can produce interesting and decorative effects.

Such coverings can be installed with relative ease, using suitable cements to secure strips of the covering material to the posts and the struts. Strips of standard widths are used, with a cement selected to adhere to the materials of the covering and to the posts and struts. Care should be used to avoid shrinkage of the covering away from the ribs along the grooves.

To render the ribs and the grooves as inconspicuous as possible, dark colors preferably are used, and when the material is aluminum, it can be anodized for this purpose. The use of a dark color masks the slots 27, so that they are virtually invisible when viewed from any distance away.

A second representative display assembly is shown in FIG. 2, to illustrate other uses of the components provided by the invention, and also to illustrate other capabilities. This display assembly is a combined fitting room 103 and manikin stand 104, with hanging racks 105 for the display of clothing on opposite sides of the fitting room.

The basic components of the fitting room 103 are four elongated corner posts 107, top and bottom frameworks comprising elongated struts 108 that extend between the upper ends and between the lower ends of the posts around three sides of the fitting room, all sides other than the front being of the same basic construction as the right side shown in full in FIG. 2. Each of the posts 107 is the same as the posts 10 shown in FIGS. 1 and has the same detailed configuration shown in FIGS. 3 through 10, including, of course, the four grooves 23 with slotted bottom walls 27, and each of the struts has the same detailed configuration as the struts shown in FIGS. 3 through 10, including the mounting brackets 19 and the tightening mechanisms 20.

The front side of the fitting room has a hinged door 109 that is mounted between a front corner post 107 forming one side of a doorway, and a fifth post 110 that is generally centered on the front wall to form the other side of the doorway. The door is mounted on conventional hinges (not shown) that have accessory brackets 74 thereon, the brackets being engaged in a post groove 23 that extends along the left side of the door. As a decorative variation from straight struts, the upper framework, above the door, has a shallow U-shaped strut having a crosspiece 111 and two short legs 112, all of the same cross-sectional configuration as in FIGS. 3 through 8. Mounting brackets 19 and tightening mechanisms 20 are mounted in the free ends of the legs 112 and are engaged in grooves 23 in the front sides of the posts defining the doorway. A short strut 113 extends across the top from the central post 110 to the left post 107.

To enclose the space within the fitting room framework thus formed, flat rectangular wallboard panels 114, 115, 117 and 118, of any suitable paneling material in a thickness that fits into the grooves 23 and 32 of the posts and the struts, are fitted in the wall spaces defined by the posts 107 and the post 110, with the margins or edge portions of the panels received in and held by the posts and the struts. This is illustrated most clearly in FIG. 11, from which it can be seen that the panel 114 will be securely confined in the grooves 23 and 32 after the posts and the struts are joined together around the panel.

Each of the illustrative hanging racks 105 on the sides of the fitting room 103 comprises two U-shaped struts formed by a cross-piece 119 and two legs 120 joined together at miter joints 121, and two hanging rods 122 having ends that are secured to the struts near the miter joints, for example, by welding. Mounting brackets 19 and tightening mechanisms 20 are provided in the free ends of the legs 120, and are engaged in grooves 23 in the two posts 107 at the corners, so that the hanging racks extend fully across the sides of the fitting room.

The illustrative manikin stand 104 is a simple framework formed by three short posts 123 and four short struts 124, all joined together in accordance with the invention, the lower portion of the post 110 constituting the fourth corner of the framework. A rectangular platform panel 125 rests on top of the framework, preferably nested inside the ribs 33 of the struts 124, to complete the manikin stand, which is joined to the fitting room 103 at the post 110, and preferably also at the left front post 107. The exposed upper ends of the posts 123 preferably are capped, either with metal caps or with fiberglass, which can be covered with decorative sheet material or left uncovered, depending upon the appearance of the cap.

This display assembly illustrates the capability of the present invention to provide integrated and coordinated display sections for several different purposes in one assembly, all in a highly decorative and utilitarian manner, using the basic components of the present invention. Of course, the posts and the struts can be covered with selected sheet materials, coordinated with the panels, for whatever decorative effect that may be desired.

It will be apparent to those skilled in the art that the number of variations is limited only by the imagination of skilled designers, who can create, with these components, a wide variety of different displays and an equally wide variety of useful and decorative accessories. Indeed, the post of the invention can be used alone, for example, as a clothes display pole, and made free-standing through the simple addition of a base (not shown) comprising a plurality of laterally projecting feet at the lower end of the post. It also will be apparent that, although specific embodiments of the posts, the struts, and the associated mounting brackets and tightening mechanisms have been illustrated and described, modifications and changes can be made therein without departing from the spirit and scope of the invention.

I claim as my invention:

1. A merchandise display framework comprising:

a plurality of upright posts of hollow, generally rectangular cross-section, each having four substantially flat sides with elongated, narrow grooves extending longitudinally of the post in the central portions of said sides, each of said grooves being bounded by two longitudinally extending ribs on the outer side of the post projecting a selected distance outwardly from the outer side, and by a channel having spaced sidewalls extending a selected distance into the post and a bottom wall extending between said sidewalls, said bottom wall having a series of slots therein of selected size and spacing; and a plurality of elongated struts of hollow, generally rectangular cross-section extending generally horizontally between said posts in a selected arrangement, and having two relatively broad sides, two relatively narrow sides, and two ends positioned adjacent to two of said posts, mounting brackets in said struts adjacent to said ends and each comprising a base plate supported in the strut for movement longitudinally of the strut toward and away from the adjacent end, and two hook-like tabs projecting from said base plate longitudinally of the strut outwardly through the end of the strut, said tabs having outer ends that are disposed in a common plane centered between said relatively broad sides and are sized and spaced to fit into two of the slots in said bottom wall, and having notches in corresponding sides for hooking around said bottom wall through the slots and loosely engaging said bottom wall, and a tightening mechanism for each of said brackets comprising a threaded stud secured to the base plate and extending longitudinally of the strut inwardly away from the base plate, a nut threaded onto said stud, means mounting said nut in said strut for rotation and holding the nut against movement longitudinally of said strut, whereby rotation of the nut in one direction shifts said stud and said base plate inwardly and away from the adjacent end of the strut to tighten said tabs against said bottom wall, and a plunger mounted on said base plate for movement relative thereto longitudinally of said strut, said plunger having an outer end portion that is movable along the side of one of said tabs opposite the notch therein, and having an inner end portion for extending inwardly beyond said base plate, spring means acting between said base and said plunger to urge the latter inwardly toward a retracted position in which said outer end portion is retracted away from the tab, and means preventing inward movement of the plunger with said base during tightening of the tabs and thereby causing the plunger to be extended along one of the tabs into the associated slot during such tightening, said outer end portion of the plunger being sized to cooperate with the tab to substantially fill the slot and thereby lock the bracket to the post as an incident to tightening;

said struts having access slots in the sides thereof that are aligned with said nuts, and the latter being large enough to extend into said access slots for manual tightening of the brackets after the tabs thereof have been inserted in the slots in said bottom walls, whereby said posts and said struts are joined securely into a rigid display assembly with the struts in selected positions along the posts and with the exposed portions of said grooves available to receive display accessories.

2. A merchandise display framework as defined in claim 1 in which said posts are covered between said grooves with decorative sheet material that is thinner than the distance said ribs project from said outer sides, and said ends of said struts abut against said ribs.

3. A merchandise display framework as defined in claim 1 in which each of said struts has two elongated narrow grooves extending longitudinally of the strut in the central portion of its relatively narrow sides, positioned to be coplanar with a groove in which one of said brackets is engaged, and further including at least one panel mounted on said framework with edges of the panel fitted in a set of coplanar grooves.

4. A merchandise display framework as defined in claim 3 in which the grooves in said struts are bounded by two longitudinally spaced ribs projecting a selected distance outwardly from said relatively narrow sides, and similar to the ribs on said posts, and in which said struts also are covered between said grooves with decorative sheet material that is thinner than the distance the ribs project away from the struts.

5. A merchandise display framework as defined in claim 1 in which said posts are one-piece extrusions comprising four wall sections integrally joined together by said channels, and with said ribs integrally joined to said wall sections as substantially coplanar outward extensions of the channel sidewalls.

6. A merchandise display framework as defined in claim 1 in which said bases base plates are flat plates supported in said struts in internal longitudinal slideways centered on a plane midway between said broad sides.

7. A merchandise display framework as defined in claim 1 in which said means mounting said nut comprise internal abutments on said struts on opposite sides of the nut.

8. A merchandise display framework as defined in claim 7 in which said struts have internal longitudinal webs that have end surfaces constituting said abutments.

9. A merchandising display having, in combination:
at least one elongated hollow post having a preselected cross-sectional shape, and having a plurality of longitudinal grooves in its outside surface at selected intervals around the post, said grooves having bottom walls that are formed with slots spaced at selected intervals along the grooves;
at least one elongated hollow strut of a preselected cross-sectional shape positioned with one end of the strut adjacent to said post in overlying relation with a selected one of said grooves;
at least one mounting bracket in said strut adjacent said one end having a base movable longitudinally of the strut, toward and away from said one end, and at least one latching element on said base projecting outwardly at said one end and into one of the said slots in said one groove of said post;
tightening means on said strut for drawing said mounting bracket into the strut and holding said latching element in tightly latched engagement with said bottom wall, thereby to attach said strut to said post, comprising a threaded stud secured to said base and extending longitudinally of said strut, a nut threaded onto said stud, and means rotatably supporting said nut in said strut and holding the nut against longitudinal movement, whereby turning of the nut shifts said mounting bracket longitudinally of the strut;
said latching element being a tab insertable into one of said slots and having a notch in one side for dropping over said bottom wall to latch said mounting bracket thereto;
and further including means for locking said mounting bracket to said bottom wall, comprising an elongated plunger mounted on said base for back and forth movement longitudinally of said strut along the side of said tab opposite the notch therein, between a retracted position and an extended position in which one end of the plunger is alongside the tab, and means for positioning the plunger in the retracted position when said mounting bracket is extended toward said one end, and shifting said plunger outwardly relative to said mounting bracket to said extended position as the mounting bracket is pulled inwardly, whereby the plunger is extended alongside said tab and into a slot in which the tab is engaged, the plunger being sized and positioned to prevent disengagement of the tab from the slot.

10. A merchandising display as defined in claim 9 in which said plunger has an inner end portion bearing against said nut and restrained thereby against inward longitudinal movement, and is slidably mounted on said base.

11. A merchandising display as defined in claim 10 further including spring means yieldably urging said plunger toward said nut, and a bearing member between said inner end portion and said nut, through which the plunger bears against the nut.

12. A strut for use in display structures and the like comprising:

an elongated hollow body of selected cross-sectional shape, mounting brackets movably mounted in the opposite ends of said body and having latching elements projecting outwardly through the ends of said body for engagement with a slotted support, and tightening mechanisms in said body connected to said mounting brackets to extend and retract said latching elements, said tightening mechanisms including means accessible from outside said body for operating the tightening mechanisms;

each of said mounting brackets having two latching elements in the form of tabs formed with notches in corresponding sides of the tabs;

and each of said tightening mechanisms comprising a threaded stud attached to the mounting bracket and extending longitudinally of the strut, a nut threaded onto said stud, and means for preventing movement of said nut longitudinally of said strut;

a plunger mounted in said strut and positioned for movement relative to the mounting bracket between an extended position in which one end of the plunger extends along the side of a tab opposite the notch therein, and a retracted position in which said one end of the plunger is retracted away from the tab;

and means for moving the plunger to the extended position as an incident to tightening of the mounting bracket, and to the retracted position as an incident to reverse movement of the bracket.

* * * * *